United States Patent [19]
Hargraves

[11] 3,780,997
[45] Dec. 25, 1973

[54] AEROBIC SEWAGE TREATMENT
[75] Inventor: William J. Hargraves, Dunedin, Fla.
[73] Assignee: Bertran & Hargraves, Inc., Tampa, Fla.
[22] Filed: Apr. 19, 1971
[21] Appl. No.: 134,968

Related U.S. Application Data
[62] Division of Ser. No. 813,242, April 3, 1969, abandoned.

[52] U.S. Cl............ 261/77, 261/122, 261/DIG. 75, 4/180, 210/220
[51] Int. Cl................................................ B01f 3/04
[58] Field of Search.................. 261/77, 121, 36 R, 261/122, 123, 124, 121 M, DIG. 75; 210/197, 169, 220, 221, 14, 15; 23/271; 43/45, 46; 209/170, 168, 169; 222/195; 195/142; 4/180

[56] References Cited
UNITED STATES PATENTS

| | | | |
|---|---|---|---|
| 582,473 | 5/1897 | Hilliard | 261/119 R X |
| 1,339,137 | 5/1920 | Rogers | 417/108 UX |
| 2,877,898 | 3/1959 | Lacey | 210/169 |
| 3,116,347 | 12/1963 | Allen | 210/220 X |
| 3,224,170 | 12/1965 | Iwanaga et al. | 261/77 X |
| 3,336,016 | 8/1967 | Schreiber | 261/123 |
| 3,339,741 | 9/1967 | Bernard et al. | 210/197 X |
| 2,353,195 | 2/1944 | Sims | 261/77 |

FOREIGN PATENTS OR APPLICATIONS

| | | | |
|---|---|---|---|
| 404,618 | 10/1924 | Germany | 261/77 |
| 407,244 | 12/1924 | Germany | 261/123 |
| 10,836 | 0/1892 | Great Britain | 261/123 |
| 23,146 | 0/1914 | Great Britain | 210/221 |
| 644,693 | 10/1950 | Great Britain | 210/169 |
| 46,644 | 4/1889 | Germany | 261/77 |

*Primary Examiner*—Tim R. Miles
*Attorney*—Cushman, Darby & Cushman

[57] ABSTRACT

Diffuser means for effecting contact between gas and a mass of liquid sewage comprising a plurality of open ended, inclined air lift pipes immersed one above another in said sewage.

4 Claims, 10 Drawing Figures

PATENTED DEC 25 1973

3,780,997

INVENTOR
WILLIAM J. HARGRAVES

BY Cushman, Darby &
Cushman
ATTORNEYS

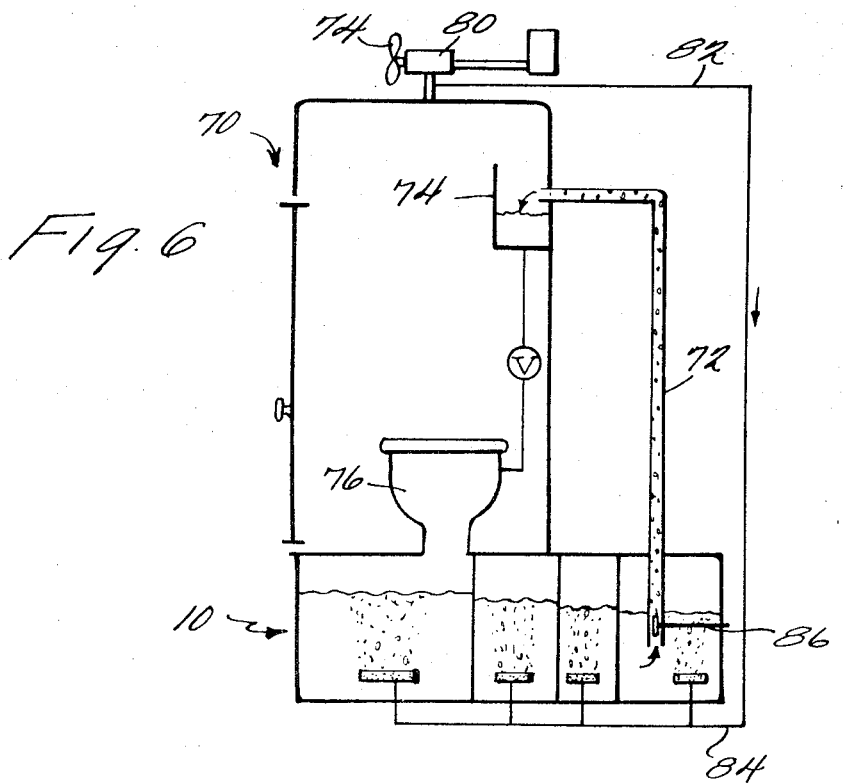
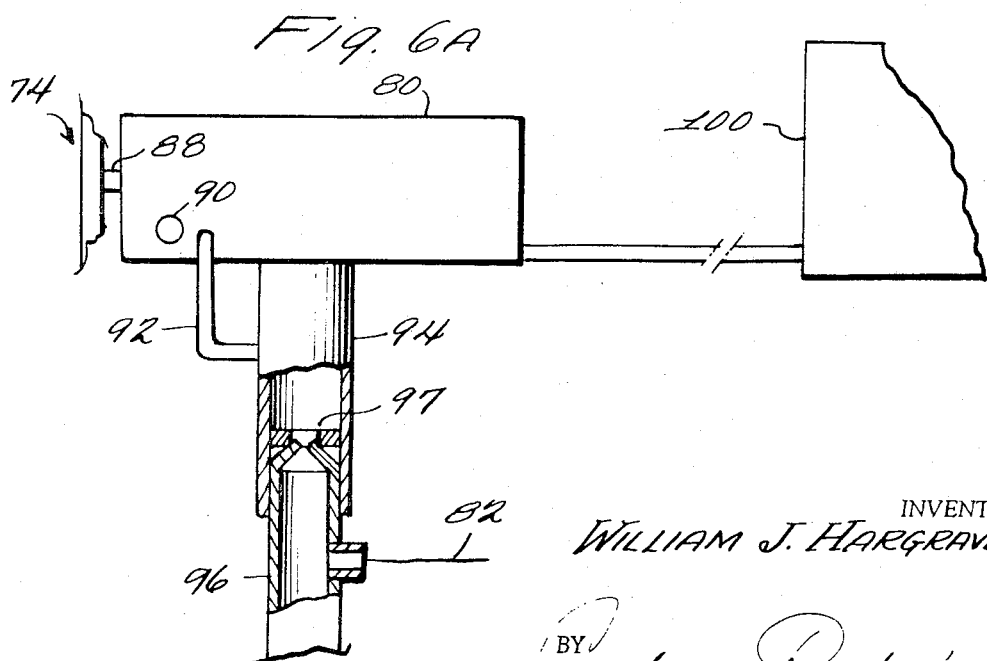

PATENTED DEC 25 1973　　　　　　　3,780,997

INVENTOR
WILLIAM J. HARGRAVES

BY Cushman, Darby &
Cushman
ATTORNEYS

AEROBIC SEWAGE TREATMENT

This is a division of application, Ser. No. 813,242, filed Apr. 3, 1969, now abandoned.

This invention relates to aerobic biochemical digestion of organic waste material and in particular to an improved digestion system in which organic waste material is sequentially treated in a series of interconnected digestion stages.

The broad principles of aerobic digestion of sewage, organic factory waste and other organic matter dispersed in or dissolved in water have been recognized for many years. The conversion of the polluted liquid to substantially pure water is effected by the feeding and multiplication of aerobic microorganisms which in the presence of oxygen chemically oxidize the organic material to volatile compounds which escape to the atmosphere. The process inherently proceeds through several different, rather complex biochemical stages and is accompanied at one stage by the formation of so-called activated sludge. All or a portion of the sludge is generally mixed with the incoming polluted stream to inoculate the latter with the microorganisms contained in the sludge and to thereby stimulate rapid synthesis of new organisms.

It is recognized that, if the biochemical process is carried out for a long period of time, not only would all the initial organic waste be consumed but also all the organisms would eventually die and themselves be consumed by the still-living organisms with the result that only a tiny fraction of inert solid material, or fine ash, would remain. As a practical matter the conventional activated sludge treatment of waste, such as the treatment of municipal sewage, is not prolonged to this extent, due to the very large volume of liquid which would accumulate during the time required for total oxidation. Instead, a portion of the activated sludge is continually or periodically removed from the treatment system, dewatered and disposed of in some suitable fashion. Generally, the technique includes a settling step during which the sludge settles out of the liquid carrying with it substantially all dispersed solids due to the highly adsorptive nature of the sludge. The clear supernatant liquid, or effluent, is discharged to waste with or without further treatment.

The present invention utilizes the principles of biochemical oxidation of waste in a special stage-type digestion system which has been found to be highly efficient to the extent that substantially total oxidation of the waste occurs, yet simple in construction and operation.

More specifically the digestion system includes a main aerated digestion chamber or stage which receives and retains all the solid organic matter to be processed until it is completely liquefied together with a plurality of series-connected secondary aeration chambers or stages. Liquid leaving the main stage, and preferably the other stages also, passes through a filter located near the bottom of the respective stage and up through a passageway into the next stage. The submerged location of the filters assures that floating material and foam do not tend to block the filter, and the pore size of the filter (for example 10 microns) assures that suspended solids do not pass from stage to stage. These features are very important, because they assure that all the solids will be digested at least to liquid form before leaving the main chamber. Further, they prevent the possibility of solid raw sewage particles passing in a direct stream through the system to the final effluent outlet, causing fresh pollution in each stage. The stage principle is important, also, in that it prevents overall mixing within the system. Therefore, since the effluent from each stage is thoroughly aerated in the next stage, the contents of each stage is of greater purity than the contents of the previous stage. The overall result is that very high purification efficiency is achieved in a lower total volume of treatment space than has heretofore been possible. In this regard it is recognized that sequentially connected aeration tanks in a municipal sized sewage treatment plant have been suggested previously. However, the retention of all solids in the first or main stage, the succeeding increase in purity obtainable in the subsequent stages and the advantage in size reduction, which are the features of the present invention, have not heretofore been suggested.

With the above brief summary in mind it will be appreciated that the system of the present invention is admirably suited for use in combination with a toilet facility, because of the system's capability of structural miniaturization while maintaining high purification efficiency in the effluent. Accordingly, one of the primary objects of the present invention is to provide a combined toilet and aeration-type digestion system which is small in size and simple in construction yet which is so highly efficient that substantially all organic waste is converted to volatile products thereby requiring little or no maintenance in the form of cleaning or emptying or removal and disposal of sludge. The combination system is admirably suited for, although not limited to, installation where space is restricted or where a temporary or portable facility is needed, such as in boats, travel trailers, parks, golf courses, fire towers, camping grounds, and the like.

The combination system is particularly adapted for closed circuit operation, in which the total liquid volume remains more or less constant. This feature together with small size makes possible the construction of a simple portable toilet facility for use where no running water is available or where it is desired to discharge no effluent to the surroundings. The portable facility may be, for example, a unitary structure for use at a construction site or the like, which includes a structure defining a waste-receiving opening (for example a toilet bowl or merely a suitable opening in the top wall of the main digestion tank), the digestion tanks themselves and an enclosing wall and door for privacy. The facility may be constructed of even smaller size by omitting the enclosing wall, the unit then being suitable for use in an existing enclosure such as the room of a summer cottage, the hull of a boat or a temporary enclosing wall erected at a camping site.

The actual size of a particular facility, that is the total volume of the digestion tanks, will of course depend on the anticipated organic load and/or volume load which must be treated, and it is not realistic to contemplate a portable unit where continuous peak-load use by a large crowd of people will occur, such as at carnivals, race tracks and the like. However, it is quite feasible to construct a truly portable efficient facility for use under relatively light-load conditions, whereas a conventional digestion system would be so much greater in size that it would not be portable and/or would be so inefficient that incoming waste could pass directly to the effluent discharge. The latter disadvantage can be readily visualized if one considers that the conventional suggestion has been merely to provide a single large digestion tank without effecting increased purity of the effluent through the use of effective filters and a plurality of secondary aeration stages. In regard to the meaning of portable it is contemplated that a facility is portable when it is sufficiently light, exclusive of liquid, to be placed in position without the use of mechanical assistance. Of course the novelty of the present system does not depend on whether a particular facility is portable in this sense but rather on the above-described combination of filters and sequentially connected secondary digestion chambers which effect an increase in efficiency and a decrease in size over prior constructions.

In a modification of the toilet facility, the digestion tanks may be spaced apart from each other in an arrangement which does not require unity of structure and portability. This embodiment has special utility in a vehicle such as a pleasure boat, trailer, bus, train or aircraft where there may be insufficient space in one location to accommodate an entire unitary facility. Under these conditions the individual digestion tanks can be constructed in various sizes and shapes so as to be fitted into different locations in the vehicle and interconnected with pipes or tubes, and pumps if necessary, to establish the required sequential flow. Under some circumstances the total liquid volume in the facility may tend to increase, and this may be compensated by evaporating water from one of the stages with heat from the vehicle engine, using a suitable heat exchanger for the purpose.

With regard to the closed circuit toilet facility it will be understood that, depending on constructional and operational variations, the volume in each stage may remain substantially constant, or the volume of purified effluent may tend to increase, or the total volume of liquid present may tend to decrease (as a result of evaporation). In the simplest, most compact facility the toilet portion is merely a suitable opening in the top wall of the main digestion chamber, so that waste is deposited directly into the liquid in that chamber, with the result that the volume input to the digestion system is relatively small thereby permitting construction of the smallest possible system for a given number of persons to be served. The same result may be had at a slight increase in complexity by providing a bowl and a flush pump which withdraws flushing water from the main digestion chamber via a filter. More sophisticated facilities where minimum size is not as critical may include a flushing arrangement which obtains flushing water from one of the secondary digestion stages (usually the last stage) via a hold-up tank. The difference between the two types of flushing is, of course, that flushing liquid withdrawn from the main stage and directly returned thereto does not count as a volume input to the main chamber (because no liquid is displaced into the next chamber), whereas flushing liquid from a later stage or from a holdup tank has the effect of increasing the volume input to the main chamber.

The invention also contemplates an improved aerating device or diffuser which increases the air-to-water contact time in the digestion stage and at the same time circulates and rotates the body of liquid in both a horizontal and vertical manner so as to assure that no stagnant, under-aerated areas occur. Briefly, the improved aerator comprises a series of inclined open ended pipes disposed one above the other in a manner such that air delivered to the lower end of the lowermost pipe bubbles upwardly through and out of that pipe and then into, through and out of the next higher pipe and so on until all the pipes have been traversed. The construction and arrangement of the ends of the pipes assures that liquid is drawn into the lower end of each pipe by the action of the rising air and that this liquid is discharged at the upper end of that pipe in a manner such that it does not mix with the liquid entering the next higher pipe. Preferably the pipes are arranged in a spiral configuration within the digestion chamber, because this creates the aforementioned flow pattern which assures continual mixing and agitation of the entire contents of the stage.

Usually the flow of air for aerating the liquid, regardless of the type of diffuser, will be obtained by an electrically driven blower. For areas where electricity is not available, the present invention contemplates the use of a wind-driven air-pump, particularly for the smaller toilet facilities.

The multi-stage digestion system described in the previous paragraphs finds its greatest utility in relatively small-load toilet facilities, but it is not limited to that environment. The system is well suited to modular construction which permits larger treatment systems to be built without any basic changes in the components. That is, additional secondary digestion chambers, as unitary components, can be added on to almost any initial system to increase the organic load and/or the volume load which can be handled. For example, the capacity of an existing toilet facility can be increased by connecting one or more secondary digestion chambers to the last chamber of the initial system. Where a system is to handle, for example, all the sewage from a single-family house, the chambers will be made in a larger size than for a portable toilet facility. The initial system is assembled using the necessary number of modular secondary chambers and may be expanded to handle additional load by adding on similarly sized secondary chambers.

The invention will be further understood from the following more detailed description taken with the drawings in which:

FIG. 6 is a schematic view of a modified toilet facility;

FIG. 6A illustrates the wind-driven air pump of FIG. 6;

Figure 1:
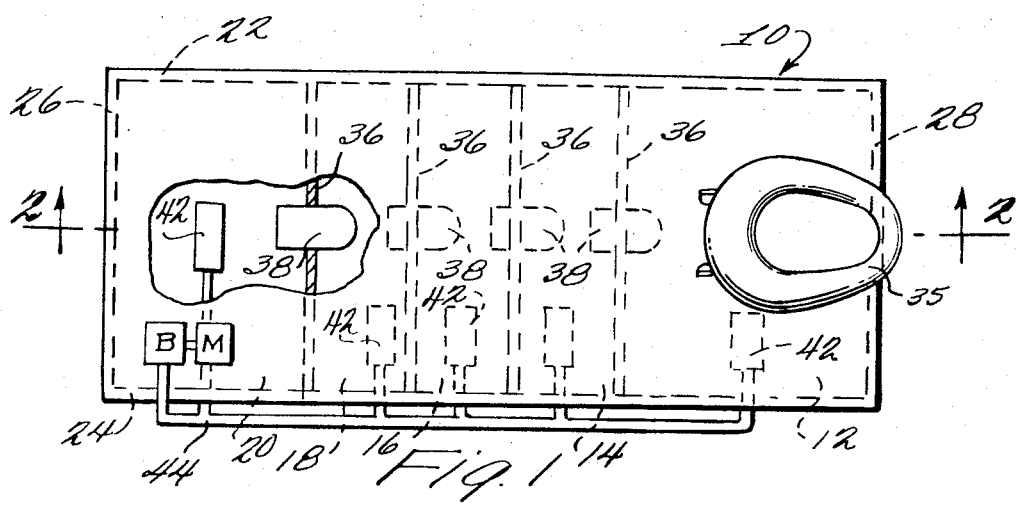
FIG. 1 is a simplified plan view of a portable toilet facility which includes a digestion system embodying the principles of the present invention.
Figure 2:
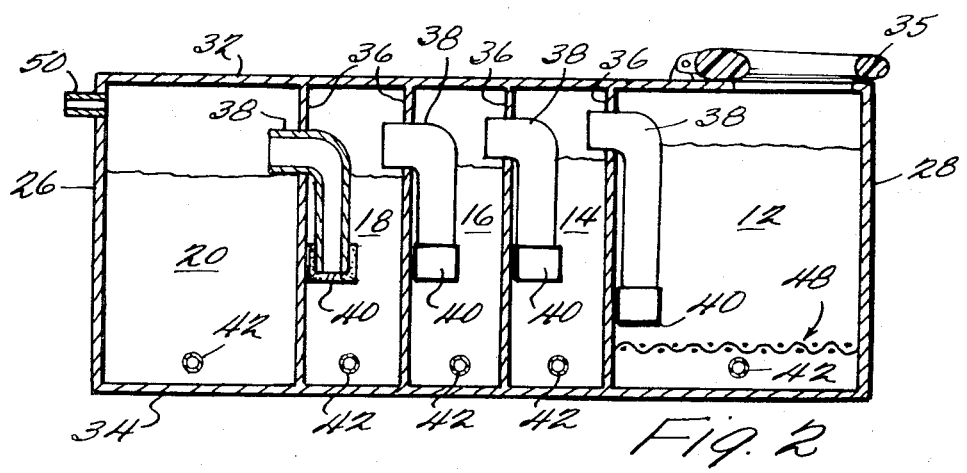
FIG. 2 is a sectional view taken on the line 2—2 of FIG. 1.

Referring first to FIGS. 1 and 2 there is shown in simplified form a simple, compact portable toilet facility 10 embodying the principles of the present invention. In the illustrated embodiment five digestion stages 12, 14, 16, 18 and 20 are arranged one behind the other as a unitary structure, the latter being defined by side walls 22, 24, end walls 26, 28 and a top and bottom wall 32 and 34. A conventional hinged toilet seat 35 is mounted directly on the top wall above the main digestion chamber 12.

The digestion chambers are defined by transverse partitions 36 extending between the side walls 22 and 24, and each chamber is connected to the next chamber through a tubular conduit 38. Each conduit 38 extends upwardly from near the bottom of its respective chamber and then longitudinally through the partition 36 into the upper part of the next chamber. The lower end of each conduit 38 is provided with a filter 40, which in the illustrated embodiment is a piece of woven fiberglass fabric wrapped and secured around the end of the conduit 38. The filters 40 face downwardly so that solid matter, if present, will tend to fall away from the filters. Preferably the upper end of each successive conduit 38 is located slightly below the conduit 38 in the preceding stage, with the result that the liquid level in each stage is slightly below that in the preceding stage.

The filter 40, which may have a pore size of the order of 10 microns, between the main digestion stage and the next stage is a critical part of the apparatus, because it prevents passage of solid particles out of the main digestion stage. In addition, the filter is a restriction in the conduit 38, so that there is a time lag between a rise in the liquid level in the main chamber 12 and the subsequent return of the liquid level to its normal position. Filters are shown between each of the successive stages, and these filters perform generally the same function as the first filter, although under ordinary circumstances there will be no dispersed raw sewage solids in these stages. On the other hand, one of the biochemical steps by which organic matter is chemically oxidized results in the formation of small dispersed particles known as flock, and the filters tend to prevent the passage of the flock into subsequent stages. Flock particles tend to increase in size from microscopic to particles visible to the eye, and the larger particles do not pass through the filter, whereas the smaller particles will pass through. As discussed previously, this retention of raw sewage solids in the main chamber assures that these solids cannot be circulated into the subsequent chambers thereby introducing fresh pollution. In addition, the filters, being restrictions to flow through their conduits, prevent free circulation between the chambers. That is, until the liquid level in a chamber rises, there is no tendency for any flow to occur through the respective conduit, and the flow which does occur is always into a subsequent chamber.

It is essential that the contents of each of the digestion chambers be thoroughly aerated and mixed. In the interest of simplicity of illustration there is shown a simple air diffusion device in the form of a porous ceramic tube 42 or air stone. Each diffuser 42 receives a supply of compressed air from any suitable supple device such as a manifold 44 which is supplied with air from a motor driven blower 46 mounted on top of the facility 10. The diffuser 42 in the main digestion chamber is disposed below a screen 48 or similar structure which prevents solids from settling on the bottom of the chamber 12. In order to aid in preventing clogging of the filters 40, in the event that solids are present, the diffusers 42 may be located directly below the filters, or additional filters (not shown) may be provided.

An improved type of diffuser is described hereinafter, although it is not essential that the improved diffuser be employed.

The embodiment illustrated in FIGS. 1 and 2 is a closed circuit type of toilet facility in that under ordinary circumstances there is no flow of effluent from the last stage 20, although an overflow outlet 50 may be provided above the normal liquid level in that stage. In operation it is contemplated that the liquid levels in the various stages will rise and fall but that no excessive throughput will require a permanent overflow system. In fact, evaporation may reduce the liquid levels in the stages to the extent that it is necessary to add additional water. It will be appreciated that this construction is the simplest and most compact and can be employed as a portable toilet facility where no running water is available. As described previously this basic arrangement can be sophisticated by incorporating it within a booth or the like to serve as a portable toilet facility for a construction site or similar location. Further, a toilet bowl of suitable construction can be provided, and flushing water can be pumped from one of the digestion stages.

A typical portable toilet facility embodying the principles of the embodiment of FIGS. 1 and 2 might have, for example, a total liquid capacity of about 50 gallons divided among the main digestion stage 12 and the secondary digestion stages, the main stage 12 having a liquid capacity equal to or slightly greater than that of any one of the secondary stages. Ordinarily at least three or more secondary stages are required, although under some circumstances two may suffice. If one assumes an input of waste to the main stage 12 of 1 quart per day per person and use of the 50-gallon facility by twenty persons, the average input is 5 gallons per day, and the theoretical hold-up time for each increment of volume passing through the system is 10 days. If a single 50-gallon digestion chamber were employed, the theoretical hold-up time would of course be the same. However, as a practical matter it would be virtually impossible to prevent overall mixing in a single, aerated chamber of this small size with the result that raw solid sewage particles and/or insufficiently treated liquid would find their way to the effluent discharge point thereby contaminating the effluent at that point.

By effective filtering between the main digestion chamber 12 and the first secondary chamber 14 and by providing a plurality of secondary chambers all solids are retained in the main chamber and mixing of insufficiently treated liquid from an early stage with liquid in or near the last stage is positively prevented. That the retention of solids in the main stage is critical for success of the system is evident from the fact that paper, for example, is more slowly digested than liquid waste and must not be permitted to pass into subsequent chambers until it has been degraded from a solid state. Liquid and very fine particles which are passed from chamber to chamber are more rapidly digested than solids so that each subsequent chamber purifies its contents to a greater degree. Also, surges in the system which might cause mixing are substantially eliminated by the presence of the filters, because the latter are of such fine pore size that they function as restrictions to flow until a pressure differential of considerable duration is established between two adjacent stages. That is, an increase in the liquid level in the main chamber 12 resulting from the deposition of waste thereinto produces flow into the next chamber 14 only at a relatively slow rate, and sequentially into the next chamber 16 at a relatively slow rate and so on through the series of chambers. At the same time the filters 40 will pass liquid at a rate which is proportional to the difference in liquid level in two adjacent stages so that a rapid increase in liquid level in the main stage 12 will be compensated for by a faster flow out of that stage to prevent flooding. Under ordinary use the fiberglass filter material referred to in the exemplary embodiment passes liquid at about 5 gallons per hour per square foot of filter area.

Figure 3:
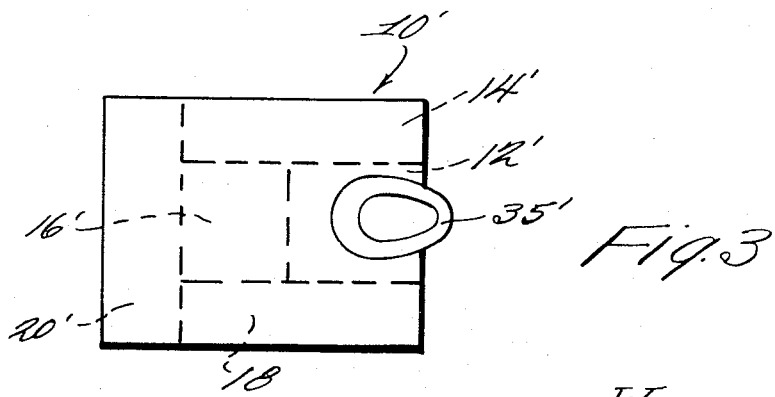
FIG. 3 is a schematic plan view of a portable toilet facility having the digestion chambers arranged in a pattern different from that in FIG. 1.

FIG. 3 illustrates in schematic form a similar closed circuit toilet facility 10' in which the digestion chambers 12', 14', 16', 18' and 20' are arranged in a different pattern, so that the overall shape of the facility in plan view is approximately square. It will be appreciated that the various digestion chambers can be arranged in any pattern to fit the space into which the facility is to be fitted. If necessary, pumps may be installed between stages, if the stages cannot be arranged for gravity flow.

Figure 5:
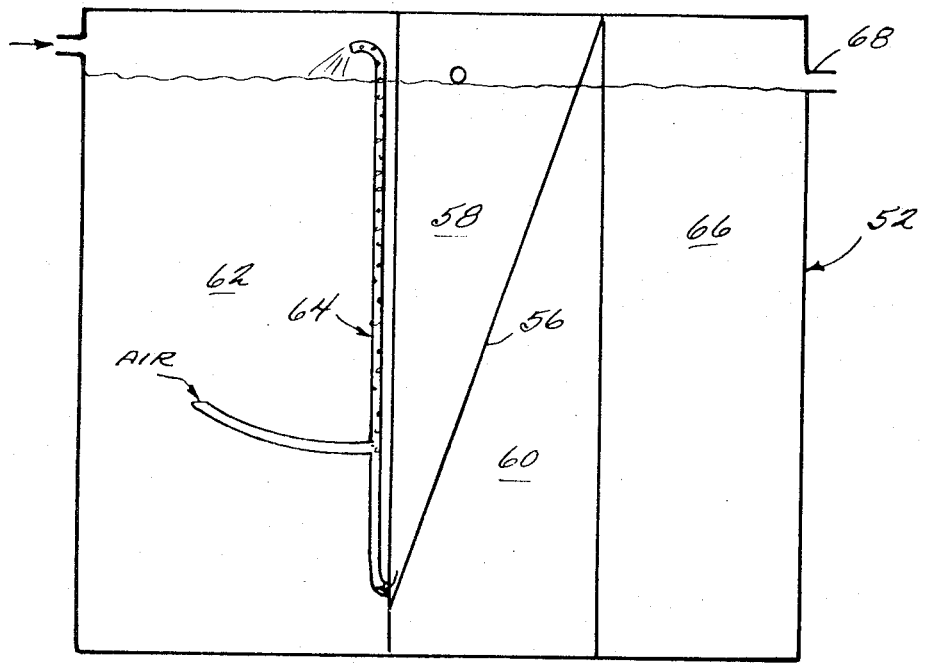
FIG. 5 is a sectional view taken on the line 5—5 of FIG. 4.
Figure 4:
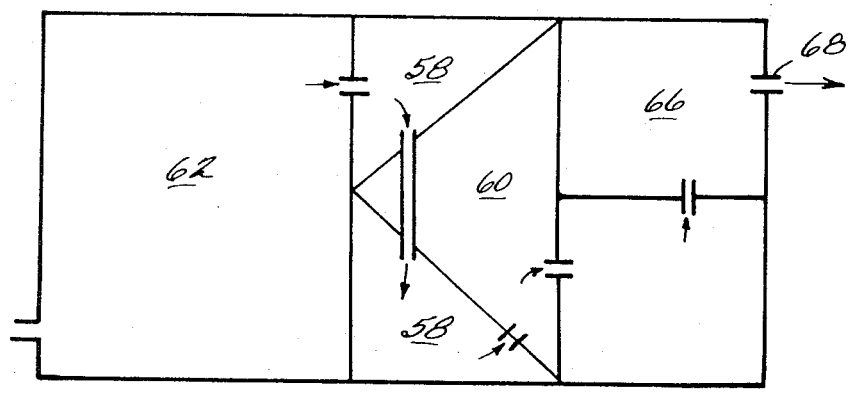
FIG. 4 is a schematic plan view of a digester suitable for treating the sewage from a single family house.

In FIGS. 4 and 5 there is illustrated schematically a digester 52 suitable for treating all the sewage from a single family house or the like. In this embodiment the first secondary digestion stage 54 is provided with two inclined partitions 56 which divide the chamber into two small flock chambers 58 and a larger aeration chamber 60. The flock chambers 58 are quiescent with the result that any particulate matter therein, such as flock, settles to the apex of the chambers 58. The settled material is then returned to the main digestion chamber 62 by any suitable means, such as an air lift 64 which receives its air supply from the diffuser air supply. The total liquid capacity of the digester 52 may be, for example, 900 gallons. In the interest of simplicity of illustration the flow connections between the main digestion chamber and the first flock chamber and between the remaining chambers are not shown in detail, and the air diffusers are omitted entirely. It will be understood that the flow connections are generally the same as those illustrated in FIGS. 1 and 2.

The effluent which is displaced from the final digestion stage 66 by sewage entering the main stage 62 is conducted from an effluent outlet 68 to a suitable discharge area or to a holding tank for subsequent use. The holding tank (not shown) will generally be aerated in the same manner as the digestion chambers in order to prevent the liquid from stagnating.

In FIG. 6 there is illustrated schematically an enclosed toilet facility 70 which embodies several additional features over and above the basic digestion system. The latter may be the system 10 illustrated in FIGS. 1 and 2 modified to permit purified water to be withdrawn from the last digestion stage 20, as by an air lift 72, for delivery to an elevated holding tank 74. The water in the holding tank 74 may subsequently be used for flushing the toilet 76 which is mounted on top of the digestion system 10. Also, in this embodiment, there is illustrated schematically a wind-driven air supply system, the system including a directional windmill 78, an air pump 80 mechanically driven by rotation of the windmill 78 and appropriate air lines 82, 84 and 86 for delivering air to the diffusers 42 and to the air lift 72.

FIG. 6A illustrates the mounting of the windmill-air pump combination. The pump 80 may be of conventional construction operated by a rotating drive shaft 88 by the action of the wind on the blades 74. Air is sucked in through an inlet 90 and discharged through a tube 92 into a sleeve 94 fixed to the pump 80. The sleeve 94 is rotatably mounted on a fixed tube 96 the upper end of which is tapered and in sliding engagement with a pivot seat secured in the tube 94. A bushing guide 98 is provided between the lower end of the tube 94 and the exterior of the tube 96. In operation the wind acting on a tail fin 100 turns the pump assembly about the axis of the tubes 94 and 96.

Figure 7:
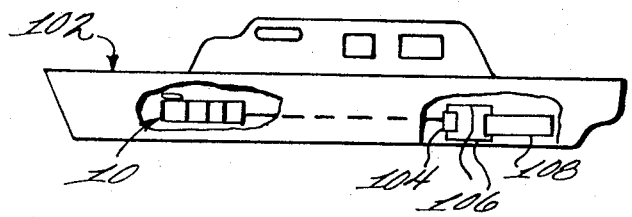
FIG. 7 is a schematic view of a pleasure boat provided with a toilet facility.

FIG. 7 illustrates in schematic form a vehicle in the form of a pleasure boat 102 having arranged in the hull a toilet facility 10 embodying the principles of the present invention. The toilet facility 10 may be of the type illustrated in FIGS. 1 and 2 and, as shown, it is modified to the extent that liquid from the last stage 20 is conducted to a heat exchanger 104 for the purpose of evaporating excess water. As shown, engine cooling water or engine exhaust can be circulated through a suitable pipe 106 from the engine 108 to the heat exchanger 104.

Figure 8:
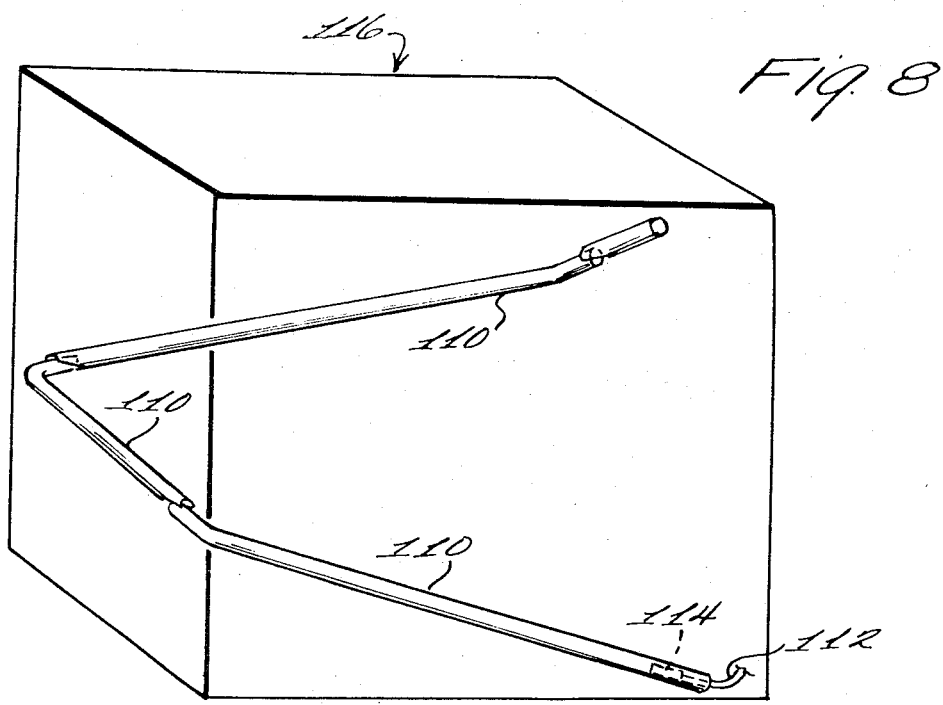
FIGS. 8 and 9 are views illustrating an improved air diffuser.
Figure 9:
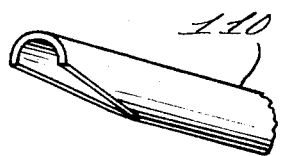

An improved air diffuser device is illustrated in FIGS. 8 and 9. This diffuser accomplishes high air-liquid contact and at the same time establishes a flow path within the respective digestion chamber which assures that continuous and thorough mixing occurs. The diffuser comprises a plurality of inclined pipes 110 which are arranged so that air supplied to the lower end of the lowermost pipe travels sequentially through all of the pipes 110, even though the pipes 110 are not directly connected to each other. Specifically, the lower end of each pipe 110, except for the lowermost pipe, is cut away at an angle as seen in FIG. 9 so that a concave surface is exposed to the air bubbles which rise from the next lower pipe 110. It has been found that this arrangement causes the liquid which is discharged from a pipe along with the air bubbles to disperse in the main body of liquid, while the air bubbles draw in a new batch of liquid as they enter the next higher pipe. In this regard it will be understood that the pipes are of sufficient diameter to function as miniature air lifts. That is, there is always a mixture of air bubbles and liquid passing upwardly through each pipe 110, never a stream of air by itself. The initial air can be introduced into the lowermost pipe 110 in any suitable manner, as by means of a tube 112 of relatively small diameter inserted into the lower end of the pipe and terminating in a small air stone 114.

As shown, the pipes 110 are arranged on the inner surface of the side walls which define the digestion chamber 116, by conventional means not illustrated for the sake of simplicity, so that the overall arrangement is generally spiral. The arrangement is not only convenient in that it does not require separate support means for the pipes 110 but also in that the spiral pattern causes violent mixing of the liquid by means of horizontal and vertical currents. More specifically, aerated liquid is forceably discharged at a plurality of levels in the chamber 116 and at every corner thereof in a direction which causes rotation of the entire mass of liquids. Since liquid is drawn off the bottom of the chamber 116, as solids settle, the solids are drawn up with the liquid, subjected to aeration and discharged with considerable force into the liquid above. When the final liquid reaches the surface it is forced upwardly at a rather steep angle to spill over the surface for further aeration by contact with surface air.

I claim:

1. An improved diffuser for effecting contact between a gas stream and a mass of liquid sewage contained within sidewalls of a chamber comprising:

a plurality of open ended inclined air-lift pipes immersed one above another in the mass of liquid sewage; and means for introducing a stream of gas bubbles into the lowermost pipe whereby liquid is entrained therein, the upper end of each pipe, except the uppermost pipe, being disposed in a position below the lower end of the next higher pipe such that air bubbles issuing from the upper end of a lower pipe cause the liquid entrained therewith to be forced outwardly into the mass of liquid sewage and so that the gas bubbles subsequently enter the lower end of the next higher pipe and entrain new liquid sewage from said mass of liquid.

2. A diffuser as defined in claim 1, wherein said air-lift pipes are arranged in a spiral arrangement so that mixing movement is imparted to said mass of liquid sewage.

3. A diffuser as in claim 2 wherein said chamber side walls form corners in said chamber and wherein the ends of said pipes are disposed in said corners.

4. A diffuser as defined in claim 1, wherein each of said lower ends except said lower end of said lowermost pipe is cut at an angle so as to expose a concave surface to said air bubbles.

* * * * *